US009590493B2

(12) United States Patent
Soares (10) Patent No.: US 9,590,493 B2
(45) Date of Patent: Mar. 7, 2017

(54) STARTUP CIRCUIT FOR A POWER SUPPLY

(71) Applicant: Bose Corporation, Framingham, MA (US)

(72) Inventor: Manoel Soares, Natick, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 14/576,069

(22) Filed: Dec. 18, 2014

(65) Prior Publication Data

US 2016/0181908 A1   Jun. 23, 2016

(51) Int. Cl.
*H02M 3/338* (2006.01)
*H02M 1/36* (2007.01)
*H02M 3/335* (2006.01)
*H02M 1/42* (2007.01)

(52) U.S. Cl.
CPC ........... *H02M 1/36* (2013.01); *H02M 1/4225* (2013.01); *H02M 3/33507* (2013.01); *Y02B 70/126* (2013.01)

(58) Field of Classification Search
CPC .................................................... H02M 3/335
USPC .............. 323/266, 282–285, 351; 363/46, 363/41.15–45.17, 20, 21.04, 21.01, 21.12, 363/21.14, 21.18, 71, 67, 69, 95, 98, 97, 363/84, 89, 131, 133
See application file for complete search history.

(56) References Cited

U.S. PATENT DOCUMENTS 4,392,087 A * 7/1983 Zansky .......................... 315/219
6,330,170 B1 * 12/2001 Wang et al. ..................... 363/37
8,212,493 B2 * 7/2012 Melanson ........... H02M 3/3374
363/16
2006/0171182 A1 * 8/2006 Siri et al. ...................... 363/131
2012/0230066 A1 * 9/2012 Lai et al. ......................... 363/37
2014/0334195 A1    11/2014 Nussbaum

FOREIGN PATENT DOCUMENTS

WO    WO 2014/182500    11/2014

OTHER PUBLICATIONS

Ciobotaru et al., "A New Single-Phase PLL Structure Based on Second Order Generalized Integrator," Proceedings of PESC, 1511-1516 (2006).
Jang et al., "Light-Load Efficiency Optimization Method," IEEE Transactions on Power Electronics, 25(1): 67-74 (2010).

* cited by examiner

*Primary Examiner* — Adolf Berhane
*Assistant Examiner* — Nusrat Quddus
(74) *Attorney, Agent, or Firm* — Fish & Richardson P.C.

(57) ABSTRACT

An example apparatus may include a power supply circuit comprising a first stage, the first stage comprising a current-fed topology and a transformer for isolating a primary side of the first stage from a secondary side of the first stage; a control module configured to provide control signals to one or more switches of the power supply circuit and to perform startup operations comprising: determining a peak line voltage value of an AC input voltage to the power supply circuit; initiating, when the power supply circuit is started, a hard-switching method; determining a center tap voltage of the transformer; stopping the hard-switching method, when the center tap voltage crosses a fraction of the peak line voltage value; and initiating, when the hard-switching method stops, a zero-voltage switching method with peak current mode control.

20 Claims, 7 Drawing Sheets

STARTUP CIRCUIT FOR A POWER SUPPLY

TECHNICAL FIELD

This disclosure relates generally to startup of a power supply.

BACKGROUND

A variety of types of power supplies (also called power converters) provide an approximately constant (e.g., DC or "direct current") output voltage from a sinusoidal (e.g., AC or "alternating current") input voltage (e.g., from an AC mains source), thus providing AC-DC conversion (also called "rectification"). Other types of power supplies provide AC-AC conversion, DC-DC conversion, or DC-AC conversion (also called "inversion"). Some power supplies include multiple stages, which may include a combination of different types of converters, such as a DC-DC converter stage within a DC-AC power supply. Converter stages that provide a DC voltage may use a regulator to maintain the DC voltage near a constant value. A linear power supply uses a linear regulator, and a switched-mode (or "switching") power supply uses a switching regulator that switches between on and off states to regulate power transfer and maintain the DC voltage.

Startup of a power supply creates distinctive operating conditions that may be managed by control circuitry.

SUMMARY

In one aspect, in general, an example apparatus comprises a power supply circuit comprising a first stage, the first stage comprising a current-fed topology and a transformer for isolating a primary side of the first stage from a secondary side of the first stage; a clamp circuit coupled to a center tap of the transformer, the clamp circuit comprising a first element that stores energy, and a second element that controls a flow of current between the center tap and the first element; and a control module that receives power from the clamp circuit, the control module configured to provide control signals to one or more switches of the power supply circuit and to perform startup operations comprising: determining a peak line voltage value of an AC input voltage to the power supply circuit; initiating, when the power supply circuit is started, a hard-switching method; determining a center tap voltage of the transformer; stopping the hard-switching method, when the center tap voltage crosses a fraction of the peak line voltage value; and initiating, when the hard-switching method stops, a zero-voltage switching method with peak current mode control. The current fed topology may be a current-fed push-pull topology. The first element may be a capacitor, the second element may be a diode, and the one or more switches may be transistors.

All examples and features described herein, including this summary section, can be combined in any technically possible way to form implementations not specifically described herein.

The details of one or more implementations are set forth in the accompanying drawings and the description below. Other features, objects, and advantages will be apparent from the description and drawings, and from the claims.

DESCRIPTION OF THE DRAWINGS

Like reference numbers represent corresponding parts and/or portions throughout.

DETAILED DESCRIPTION

An example startup method is able to manage the establishment of initial or nominal output voltage in various kinds of current-fed isolated power supplies. The example startup method may be described with reference to the example simplified circuit diagram 100 of FIG. 1, which represents a current-fed boost converter with a push-pull topology. This circuit diagram is described in association with the original FIG. 18 in co-pending U.S. application Ser. No. 13/891,503 (hereinafter "the '503 application") entitled "Managing Leakage Inductance in a Power Supply" and filed on May 10, 2013, the content of which is incorporated herein by reference in its entirety. Some aspects of this application may be repeated herein to provide context for the example systems and methods disclosed herein.

Figure 1:
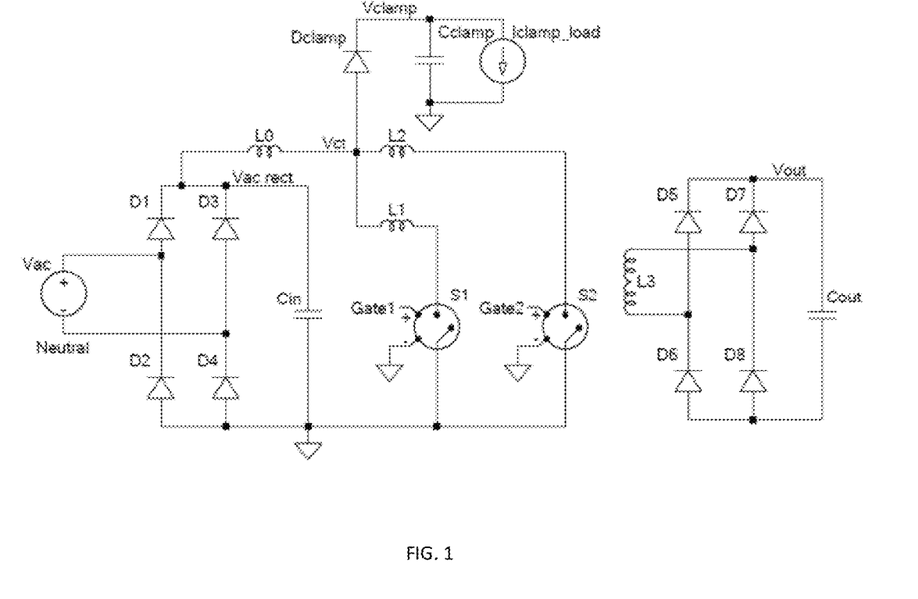
FIG. 1 shows an example simplified circuit diagram of a current-fed boost converter with a push-pull topology.
Figure 7:
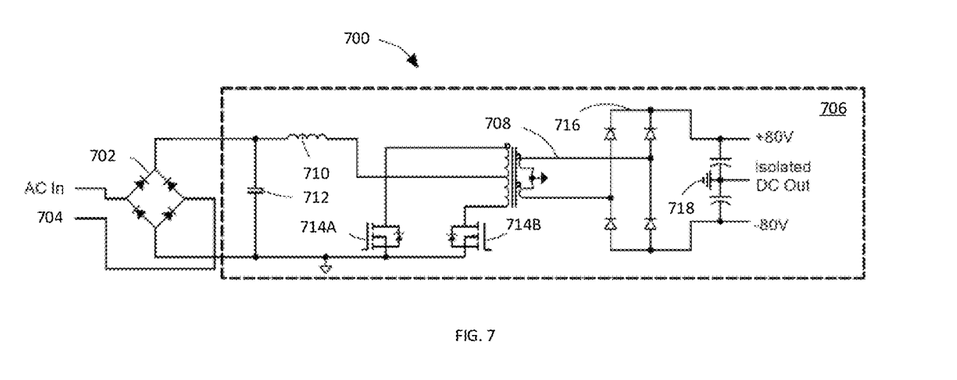
FIG. 7 shows an example power supply.

The circuit diagram shown in FIG. 1 herein is a simplified version of the circuit diagram shown in FIG. 2 of the '503 application, which is reproduced as FIG. 7 herein. FIG. 7 shows an example power supply 700. An input rectifier 702 (an arrangement of diodes) couples an AC input 704 (e.g., an AC line voltage) to an isolated power factor correction ("PFC") converter 706 also having a push-pull circuit topology. The converter 706 includes a transformer 708 with a center tap on its primary winding coupled to an input inductor 710. The primary side of the isolated PFC converter 706 also includes an input capacitor 712. The primary winding is also coupled to a first switch 714A on one end and a second switch 714B on the other end. The switches 714A and 714B are part of the switching regulator that controls the DC output voltage, as well as the AC input current. The secondary winding is coupled to output rectifiers 716 (an arrangement of diodes), and a capacitor set 718 that provides an isolated DC output voltage. A control module (not shown) controls the switches of the power supply 700, including the opening and closing of the switches 714A and 714B, as described in more detail below. With the presence of the input inductor 710 coupled to the center tap of the transformer 708, this power supply 700 is also an example of a power supply having a current-fed push-pull topology.

The "startup" of a power supply may refer to the period beginning when the power supply is initiated and ending when output capacitor(s) in the power supply reach their nominal setpoint(s). For example, in the context of circuit diagram 100 shown in FIG. 1, startup may begin when the converter is turned on and end when the voltage across the output capacitor $C_{out}$ reaches its nominal setpoint.

Figure 2:
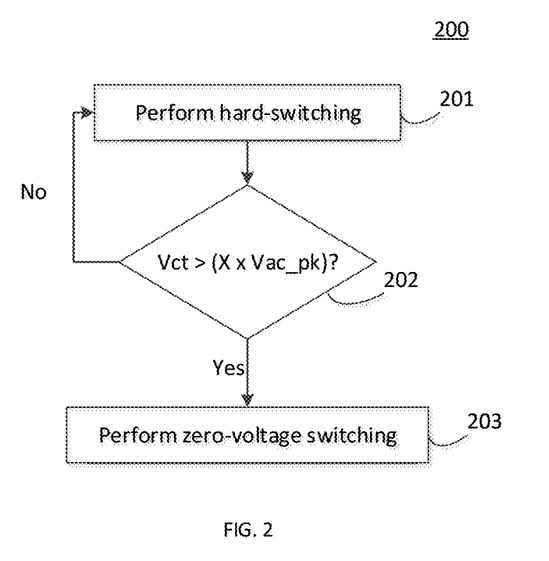
FIG. 2 shows an example power supply startup method.

FIG. 2 shows an example power supply startup method 200. The example startup method incorporates two constituent methods: (a) a hard-switching hysteretic current control method ("hard-switching method") and (b) a zero-voltage switching method with peak current mode control ("ZVS method"). The example method 200 may be implemented by a control module, which may be a digital signal processing (DSP) processor. Information regarding each of these methods and their implementations is provided in the '503 application).

Some advantages of example startup method 200 may be described in the context of example circuit diagram 100 (FIG. 1). First, using the ZVS method for part of startup (as opposed to solely using the hard-switching method) may increase the lifespan of various circuit devices such as, for example, the output rectifier diodes D5 D6 D7 and D8. This is because, in some implementations, the ZVS method may impose lower di/dt values and less stress on the output rectifier diodes as the switches S1 and S2 may be closed when there is approximately 0 Volts across their open terminals. The hard-switching method, in some implementations, may impose higher di/dt values and more stress on the output rectifier diodes because the switches may be closed when there is a relatively larger voltage across their open terminals. This effect may be more pronounced at higher input voltages because the output capacitor $C_{out}$ may take longer to charge and there may be more hard-switching transitions. Therefore, using the ZVS method for part of startup may increase the lifespan of the circuit.

Second, when the ZVS method is performed, the clamp voltage $V_{clamp}$ may not need to be directly regulated. Recall that the ZVS method may operate when the current through the main inductor L0 is controllable (e.g., when the center tap voltage $V_{ct}$ is greater than the instantaneous rectified AC line voltage $V_{ac\_rect}$). Therefore, because the current may be limited without opening both switches S1 and S2, $V_{clamp}$ may not need to be directly regulated. Accordingly, in some cases, using the ZVS method for part of startup (as opposed to solely using the hard-switching method) may reduce stress on various circuit devices, increase efficiency, and reduce costs. Additional details regarding the example startup method 200 are provided below.

In example operation 201 (FIG. 2), the hard-switching method may be performed. For example, the hard-switching method may be performed at the beginning of startup. In the context of the example circuit diagram 100, in this example, the ZVS method is not performed at this time because the center tap voltage $V_{ct}$ is small and the current through the main inductor L0 is not effectively controllable when $V_{ct} < V_{ac\_rect}$. Further, the small amount of magnetizing current may cause the voltage pulses across the open switches to be too small to be reliably detected for peak current mode control with zero-voltage switching. Therefore, at the beginning of startup, the power supply may ramp the current through L0 (e.g., ramping monotonically).

In example decision operation 202, it is determined whether $V_{ct} > (X \times V_{ac\_pk})$, where the variable $V_{ct}$ is the center tap voltage; X is a fraction (discussed below); and $V_{ac\_pk}$ is the peak of the AC line voltage $V_{ac}$. The determination may be made by a comparator (e.g., an analog comparator) that is connected to a control module. If the determination is false, then the control module may continue performing the hard-switching method. If the determination is true, then the control module may proceed to example operation 203 and perform the zero-voltage switching method. In some implementations, the control module may account for a delay in changing the current control method by ordering the change shortly before $V_{ct} > (X \times V_{ac\_pk})$.

The center tap voltage may be determined in numerous ways. For example, the center tap voltage may be calculated by multiplying the output voltage by the transformer turns ratio. As another example, the center tap voltage may be calculated by taking half the voltage measured across switches 1 or 2 when they are open. As yet another example, the center tap voltage may be directly measured using additional circuitry not shown.

The value selected for X may depend on the given circuit topology and the input voltage. Generally, for a given input voltage, a lower value of X may require more time to charge the output capacitors, whereas a higher value of X may impose more stress on the output rectifier diodes. Further, the value of X may also be selected to help ensure that, when the changeover to the ZVS method occurs, the voltage pulses across the switch are sufficiently large to be reliably detected for peak current mode control with zero voltage switching. In the context of example circuit diagram 100, X may be substantially equal to 0.50; alternatively, X may be substantially equal to 0.30, 0.35, 0.40, 0.45, 0.55, 0.60, 0.65, 0.70, 0.75, 0.80, 0.85, 0.90, 0.95 or other values less than 1. In other circuit topologies, X may be substantially equal to 0.30, 0.35, 0.40, 0.45, 0.50, 0.55, 0.60, 0.65, 0.70, 0.75, 0.80, 0.85, 0.90, 0.95 or other values less than 1. As an example, if X=0.5, and the ZVS mode is initiated when $V_{ct} > (0.5 \times V_{ac\_pk})$, there will initially be at least a 30 degree available conduction angle on either side of the AC line zero crossing. In some implementations, this minimum potential conduction angle may be obtained by calculating the arc sin(X). Conduction does not necessarily occur over the entire minimum potential conduction angle because, for example, the ZVS method stops whenever the center tap voltage $V_{ct}$ is less than the instantaneous line voltage $V_{ac}$.

Figure 3:
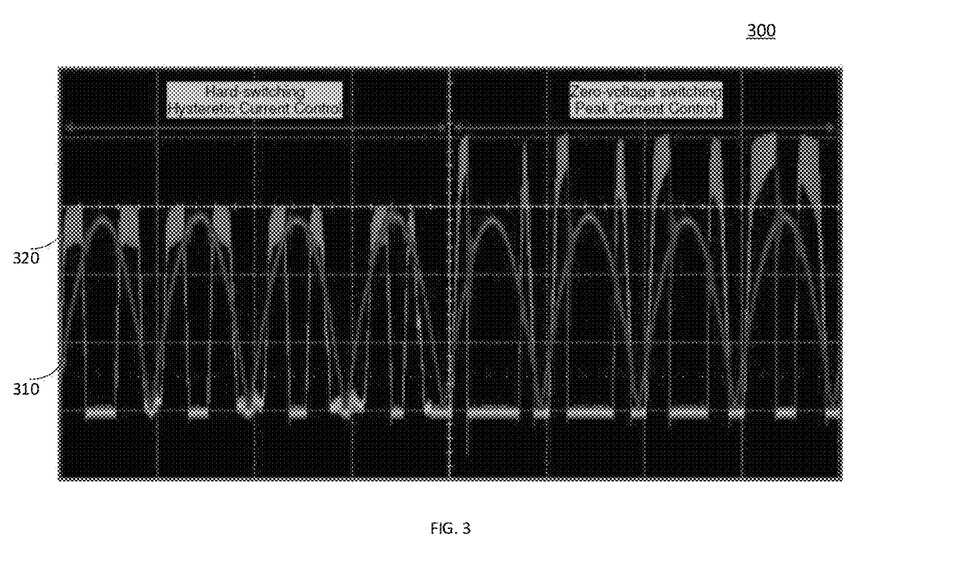
FIG. 3 shows an example plot from an example power supply startup method.

FIG. 3 is a plot from an example changeover between hard-switching and ZVS methods during startup. The rectified line voltage 310 (50V/div) and the current 320 (5 A/div) are plotted as functions of time. The left half of the plot represents a hard-switching method and the right half represents a ZVS method.

Figure 4:
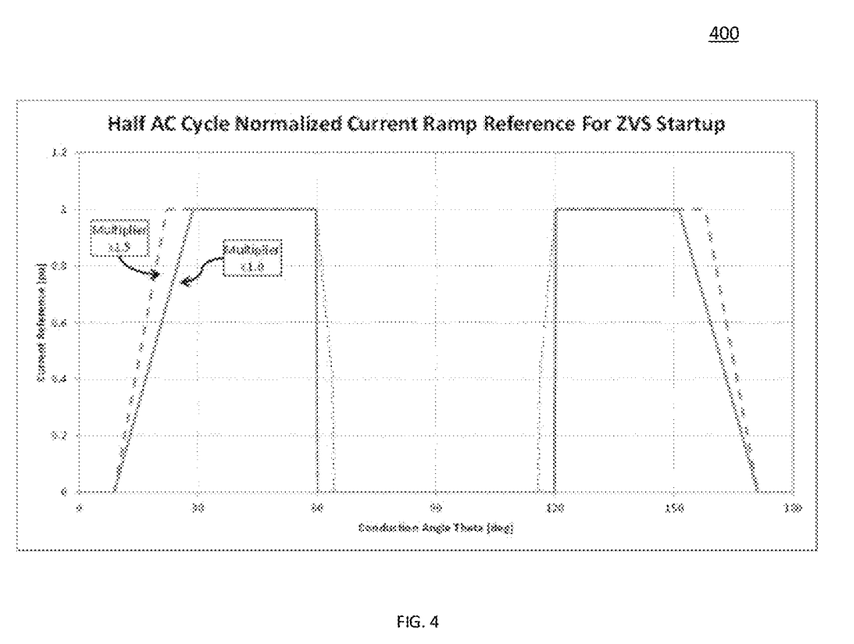
FIG. 4 shows an example graph of the current reference as a function of the current conduction angle for a zero-voltage switching ("ZVS") method.
Figure 5:
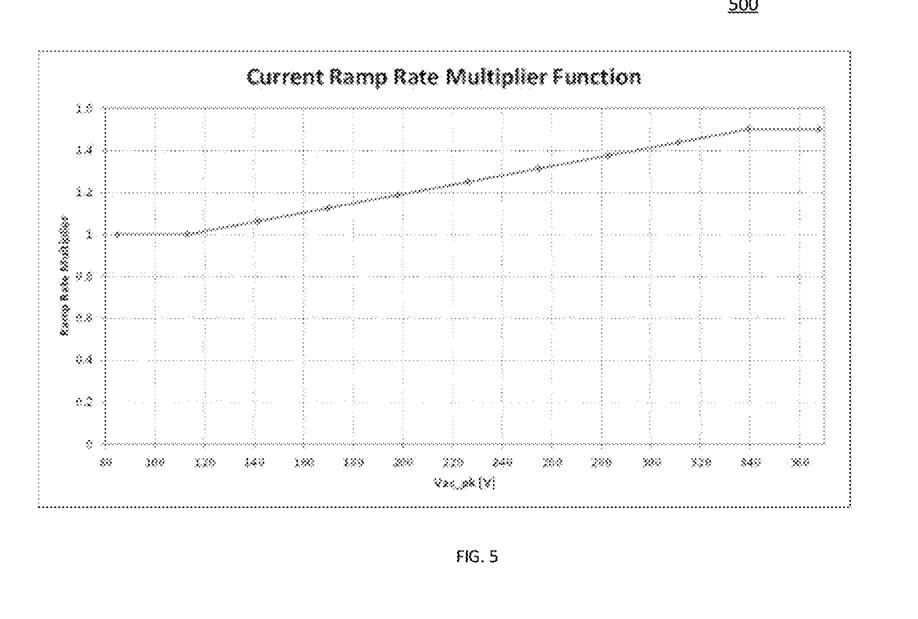
FIG. 5 shows an example graph of the ramp rate multiplier as a function of the peak AC line voltage $V_{ac\_pk}$ for a ZVS method.

After the ZVS method is initiated, the input current may be increased. For example, in FIG. 3, after the ZVS method is initiated the maximum current level is quickly ramped from 15 A to a limit of 20 A. The current ramp rate (e.g., the ramp up rate or the ramp down rate), and the current magnitude limit may depend on numerous factors such as the given circuit topology and the line voltage. These variables may be chosen to increase power throughput while reducing the line voltage oscillations that may occur when both switches are open. The current ramp rate may be based on averaged measurements of the peak line voltage. In some implementations, the higher the peak line voltage, the faster it may be possible to ramp-up the current without causing significant line voltage oscillations. If the line voltage oscillations become too large, in some implementations, $V_{clamp}$ may be increased beyond its hardware protection limit. FIG. 4 shows an example graph 400 of the current reference as a function of the current conduction angle. FIG. 5 shows an example graph 500 of the ramp rate multiplier as a function of the peak AC line voltage $V_{ac\_pk}$.

Figure 6:
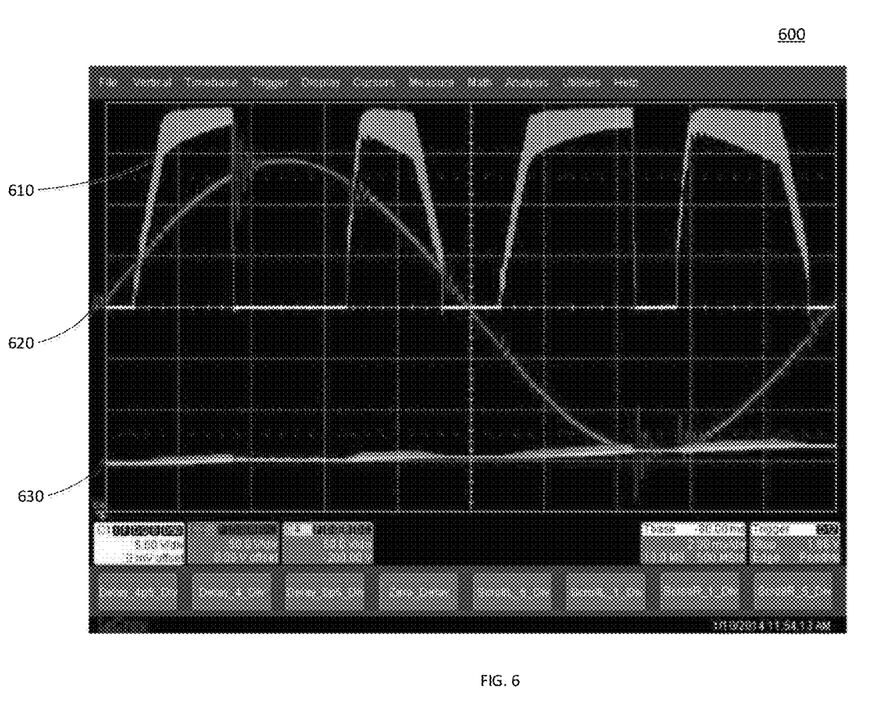
FIG. 6 shows an example plot.

Further, after the ZVS method is initiated, the current conduction angle may increase as the center tap voltage $V_{ct}$ increases. FIG. 6 shows an example plot 600 of an output voltage $V_{out}$ 630, AC line voltage, 620, and current 610 derived from a circuit using the ZVS method. The AC line used to create this plot had 100 Vrms at 50 Hz. As shown in FIG. 6, the current conduction angle may increase as $V_{out}$ 630, thereby causing $V_{ct}$ to increase.

After startup ends, a switching method other than example startup method 200 (and its constituent ZVS method) may be used. In some implementations, after startup ends, the switching method may be a ZVS peak current mode control with a current conduction angle that varies across different AC half-cycles.

A number of implementations have been described. Nevertheless, it will be understood that additional modifications may be made without departing from the scope of the inventive concepts described herein, and, accordingly, other examples are within the scope of the following claims.

Some elements can be implemented using multiple discrete elements combined into one element that serves a desired function. Elements of different implementations described herein may be combined to form other examples not specifically set forth above. Elements may be left out of the structures described herein without adversely affecting their operation. Furthermore, various separate elements may be combined into one or more individual elements to perform the functions described herein. For example, in some implementations, a hard-switching method can be performed around the AC line zero crossings where ZVS is difficult to be achieved, in order to increase charging rate of the output capacitor.

Any "electrical connection" as used and/or described herein may imply a direct physical connection or a connection that includes intervening components but that nevertheless allows electrical signals (including wireless signals) to flow between connected components. Any "connection" involving electrical circuitry mentioned and/or described herein, unless stated otherwise, is an electrical connection and not necessarily a direct physical connection regardless of whether the word "electrical" is used to modify "connection."

Though the elements of several views of the drawings may be shown and described as discrete elements in a block diagram and may be referred to as "circuitry," unless otherwise indicated, the elements may be implemented as, and/or controlled by, one of, or a combination of, analog circuitry, digital circuitry, or one or more microprocessors executing software instructions. The software instructions may include digital signal processing (DSP) instructions. Operations may be performed by analog circuitry or by a microprocessor executing software that performs the mathematical or logical equivalent to the analog operation. Unless otherwise indicated, signal lines may be implemented as discrete analog or digital signal lines, as a single discrete digital signal line with appropriate signal processing to process separate streams of audio signals, or as elements of a wireless communication system. Some of the processes may be described in block diagrams. The activities that are performed in each block may be performed by one element or by a plurality of elements, and may be separated in time. The elements that perform the activities of a block may be physically separated. Unless otherwise indicated, audio signals or video signals or both may be encoded and transmitted in either digital or analog form; conventional digital to-analog or analog-to-digital converters may not be shown in the figures.

Systems and techniques described herein, or portions thereof, can be implemented as, and/or controlled by, a computer program product that includes instructions that are stored on one or more non-transitory machine-readable storage media, and that are executable on one or more processing devices. The systems and techniques described herein, or portions thereof, can be implemented as, and/or controlled by, an apparatus, method, or electronic system that can include one or more processing devices and memory to store executable instructions to implement the stated operations. For example, it should be understood by one of skill in the art that any computer-implemented operations may be stored as computer-executable instructions on a computer-readable medium such as, for example, floppy disks, hard disks, optical disks, Flash ROMS, non-volatile ROM, and RAM. Furthermore, it should be understood by one of skill in the art that the computer-executable instructions may be executed on a variety of processors such as, for example, microprocessors, digital signal processors, gate arrays, etc. For ease of exposition, not every operation or element of the systems and methods described above is described herein as part of a computer system, but those skilled in the art will recognize that each operation or element may have a corresponding computer system or software component.

What is claimed is:

1. An apparatus comprising:
a power supply circuit comprising a first stage, the first stage comprising a current-fed topology and a transformer for isolating a primary side of the first stage from a secondary side of the first stage;
a clamp circuit coupled to a center tap of the transformer, the clamp circuit comprising a first element that stores energy, and a second element that controls a flow of current between the center tap and the first element; and
a control module that receives power from the clamp circuit, the control module configured to provide control signals to one or more switches of the power supply circuit and to perform startup operations comprising:
determining a peak line voltage value of an AC input voltage to the power supply circuit;
initiating, when the power supply circuit is started, a hard-switching method;
determining a center tap voltage of the transformer;
stopping the hard-switching method, when the center tap voltage crosses a fraction of the peak line voltage value; and
initiating, when the hard-switching method stops, a zero-voltage switching method with peak current mode control,
wherein the fraction of the peak line voltage value is 0.3, 0.4, 0.5, 0.6, 0.7, 0.8 or 0.9 times the peak line voltage value.

2. The apparatus of claim 1, wherein the first element comprises a capacitor, the second element comprises a diode, and the one or more switches comprise one or more transistors.

3. The apparatus of claim 2, wherein the current-fed topology comprises a current-fed push-pull topology.

4. The apparatus of claim 1, wherein the zero-voltage switching method comprises increasing an input current to the power supply circuit.

5. The apparatus of claim 4, wherein the rate of changing the input current is based on one or more peak line voltage values.

6. The apparatus of claim 1, wherein the zero-voltage switching method comprises adjusting a current conduction angle of an input current to the power supply circuit based on the center tap voltage.

7. The apparatus of claim 1, wherein the zero-voltage switching method comprises:
changing an input current to the power supply circuit at a rate based on one or more peak line voltage values; and
adjusting a current conduction angle of the input current based on the center tap voltage.

8. A method for a power supply circuit comprising a first stage, the first stage comprising a current-fed topology and a transformer for isolating a primary side of the first stage from a secondary side of the first stage; a clamp circuit coupled to a center tap of the transformer, the clamp circuit comprising a first element that stores energy, and a second element that controls a flow of current between the center tap and the first element; and a control module that receives power from the clamp circuit, the control module configured to provide control signals to one or more switches of the power supply circuit and to perform startup operations, the method comprising:
  determining a peak line voltage value of an AC input voltage to the power supply circuit;
  initiating, when the power supply circuit is started, a hard-switching method;
  determining a center tap voltage of the transformer;
  stopping the hard-switching method, when the center tap voltage crosses a fraction of the peak line voltage value; and
  initiating, when the hard-switching method stops, a zero-voltage switching method with peak current mode control,
  wherein the fraction of the peak line voltage value is 0.3, 0.4, 0.5, 0.6, 0.7, 0.8 or 0.9 times the peak line voltage value.

9. The method of claim 8, wherein the first element comprises a capacitor, the second element comprises a diode, and the one or more switches comprise one or more transistors.

10. The method of claim 9, wherein the current-fed topology comprises a current-fed push-pull topology.

11. The method of claim 1, wherein the zero-voltage switching method comprises increasing an input current to the power supply circuit.

12. The method of claim 11, wherein the rate of changing the input current is based on one or more peak line voltage values.

13. The method of claim 1, wherein the zero-voltage switching method comprises adjusting a current conduction angle of an input current to the power supply circuit based on the center tap voltage.

14. The method of claim 1, wherein the zero-voltage switching method comprises:
  changing an input current to the power supply circuit at a rate based on one or more peak line voltage values; and
  adjusting a current conduction angle of the input current based on the center tap voltage.

15. An apparatus comprising:
  a power supply circuit comprising a first stage, the first stage comprising a current-fed topology and a transformer for isolating a primary side of the first stage from a secondary side of the first stage, the transformer comprising a center tap;
  a control module configured to provide control signals to one or more switches of the power supply circuit and to perform startup operations comprising:
    determining a peak line voltage value of an AC input voltage to the power supply circuit;
    initiating, when the power supply circuit is started, a hard-switching method;
    determining a center tap voltage of the transformer;
    stopping the hard-switching method, when the center tap voltage crosses a fraction of the peak line voltage value; and
    initiating, when the hard-switching method stops, a zero-voltage switching method with peak current mode control,
    wherein the fraction of the peak line voltage value is 0.3, 0.4, 0.5, 0.6, 0.7, 0.8 or 0.9 times the peak line voltage value.

16. The apparatus of claim 15, wherein the current-fed topology comprises a current-fed push-pull topology.

17. The apparatus of claim 15, wherein the zero-voltage switching method comprises increasing an input current to the power supply circuit.

18. The apparatus of claim 17, wherein the rate of changing the input current is based on one or more peak line voltage values.

19. The apparatus of claim 15, wherein the zero-voltage switching method comprises adjusting a current conduction angle of an input current to the power supply circuit based on the center tap voltage.

20. The apparatus of claim 15, wherein the zero-voltage switching method comprises:
  changing an input current to the power supply circuit at a rate based on one or more peak line voltage values; and
  adjusting a current conduction angle of the input current based on the center tap voltage.

* * * * *